United States Patent [19]

Abe

[11] 3,819,908

[45] June 25, 1974

[54] MICROFICHE FILM SHEET DETECTION DEVICE FOR MICRO-READERS AND MICRO-PRINTERS

[75] Inventor: Takeshi Abe, Yokohama, Japan

[73] Assignee: Ricoh Co. Ltd., Tokyo, Japan

[22] Filed: Sept. 13, 1972

[21] Appl. No.: 288,558

[30] Foreign Application Priority Data

Sept. 14, 1971 Japan .................................. 46-70919

[52] U.S. Cl. ....................235/61.11 E, 235/61.12 R, 340/173 LT

[51] Int. Cl. ............................................... G06k 7/14

[58] Field of Search.......................... 353/25, 26, 27; 235/61.11 E, 61.12 R; 209/111.7; 340/173 LT

[56] References Cited

UNITED STATES PATENTS

| | | | |
|---|---|---|---|
| 2,792,175 | 5/1957 | Amundsen | 235/61.11 E |
| 3,034,643 | 5/1962 | Keller et al. | 235/61.12 R |
| 3,684,865 | 8/1972 | Sakamoto | 235/61.11 E |
| 3,731,060 | 5/1973 | Weinstein | 340/173 LT |

*Primary Examiner*—Thomas A. Robinson
*Attorney, Agent, or Firm*—Cooper, Dunham, Clark, Griffin & Moran

[57] ABSTRACT

Disclosed is a microfiche film sheet detection device for micro-readers and micro-printers. A number of microfiche film sheets are stored in a storage case, and each is provided with indentifying coded symbols. The microfiche film sheets in the storage case are successively withdrawn to a detecting position, and a detecting means reads out successively the coded symbols of each withdrawn microfiche film sheet. The coded symbols which are thus read out are compared with a selected set of coded symbols to select a desired microfiche film sheet. A selected microfiche film sheet is further withdrawn to a position in which the information microfilmed thereon can be read out.

15 Claims, 5 Drawing Figures

MICROFICHE FILM SHEET DETECTION DEVICE FOR MICRO-READERS AND MICRO-PRINTERS

BACKGROUND OF THE INVENTION

The invention relates to microfiche film sheet detection devices for micro-readers and micro-printers.

Microfiche film sheets are customarily stored in storage cases which are movable in rotational or sliding motion. The individual microfiche film sheets in the storage case are each provided with identifying markings which can be read out for the purpose of selecting a particular microfiche film sheet. The most common type of such identifying markings are notches of different shapes which are formed in the clips attached to the individual microfiche film sheets. These notches of different shapes are commonly read out by mechanical means. In some cases, microfiche film sheets are stored in bags provided with identifying notches.

Some disadvantages are associated with microfiche film sheet retrieval systems which utilize identifying markings in the form of differently shaped notches. Forming of the notches is a relatively slow and complicated process, and reading out the information coded by these notches is also a relatively slow and complex process. Thus, systems of that type are relatively expensive and are not suited for rapid selection and read-out of desired film sheets.

Accordingly, a need exists for a retrieval system in which the individual microfiche film sheets are easily and conveniently marked with identifying markings and in which the selection of stored microfiche film sheets is carried out conveniently and at high speed.

SUMMARY OF THE INVENTION

The invention relates to a microfiche film sheet detection device for micro-readers and micro-printers. A set of coded symbols is provided at one marginal portion of each microfiche film sheet, preferably simultaneously with microfilming information in a plurality of frames on the film sheet. The microfiche film sheets in the storage case are successively withdrawn by a detection device to a sensing position in which the coded symbols are read out. When the coded symbols read off a particular microfiche film sheet correspond to a selected set of coded symbols, the microfiche may be further withdrawn for reading out the microfilmed information recorded thereon.

One specific embodiment of a detection device comprises means for successively withdrawing microfiche film sheets to a detecting position which is a small distance from the storage case, a light source producing a light beam adapted to be transmitted through the sets of coded symbols on the microfiche film sheets, and means for receiving the light beam transmitted through these sets of coded symbols. The coded symbols may be on a marginal portion of the microfiche film sheets, which marginal portion is within a cutout of a clip attached to the microfiche film sheet. The means for successively withdrawing the microfiche film sheets from the storage case to the detecting position may comprise a roller permitting a toothed flexible member to move thereabout, which toothed flexible member holds the clips of the microfiche film sheets. Alternately, the means for successively withdrawing the microfiche film sheets may comprise a star wheel holding between its teeth the clips of successive microfiche film sheets to bring them to a detecting position. Still alternately, the means for successively withdrawing the microfiche film sheets may comprise a withdrawal magnet for successively moving microfiche film sheets to a detection position.

DETAILED DESCRIPTION

Figure 1:
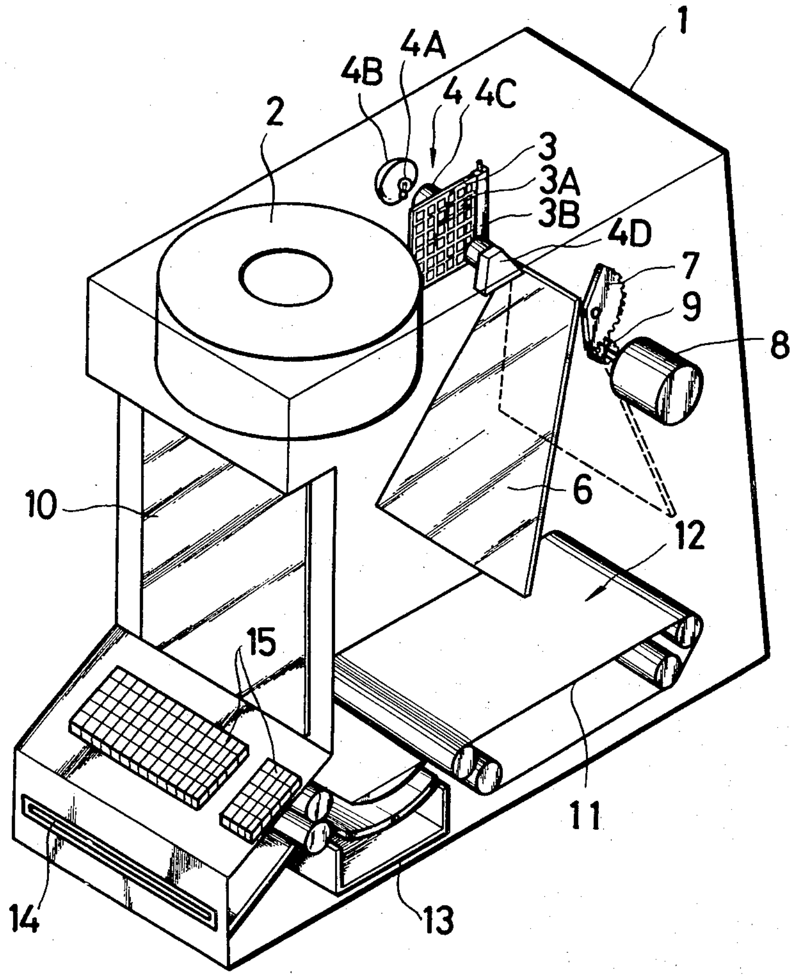
FIG. 1 is a perspective schematic view of a micro-reader-printer incorporating a detection device according to the invention.

Referring to FIG. 1, a microfiche film storage case 2 is rotatably mounted in the upper portion of a casing 1 of a micro-reader-printer. The film storage case 2 is cylindrical in shape and contains a plurality of radially arranged film sheets 3. Each microfiche film sheet 3 comprises a plurality of frames 3A each containing microfilmed information, and has a clip 3B attached to one marginal portion thereof.

For identification purposes, and for the purpose of selecting a desired film sheet, each film sheet 3 is provided with a characteristic set of coded symbols. A desired film sheet 3 may be selected on the basis of its characteristic set of coded symbols and may be taken out of the storage case 2 to the position illustrated in FIG. 1. In that position, the information stored in a selected frame of the microfiche film sheet 3 may be read out. In the interest of brevity, and since it forms no part of the subject invention, the suitable means for moving a selected microfiche film sheet to a read-out position is not illustrated in FIG. 1. Once a microfiche film sheet 3 is in the read-out position shown in FIG. 1, a selected frame thereof may be read out by means of an optical system 4 comprising a light source 4A, a reflector 4B, a lens system 4C and a reflector 4D. Disposed below the reflector 4D is another reflector 6 which is mounted for pivotal motion on a shaft having a segmental gear 7 secured thereto. The reflector 6 can be moved from the solid line position to the dashed line position by means of a motor 8 having a pinion 9 which is secured to its output shaft and is in meshing engagement with the segmental gear 7.

The microfilmed information of a frame of a microfiche film sheet 3 may be either projected for viewing, or printed. For the purpose of viewing, a screen 10 is provided at the front of the casing 1, and for the purpose of printing, a conveyor belt 11 is disposed at an exposing position 12 at the lower portion of the casing 1. Disposed adjacent the exposing station 12 are developing means 13 and a photosensitive sheet outlet port 14.

For the purpose of identifying a desired microfiche film sheet 3, push button means 15 is provided at the front portion of the case 1. When the appropriate buttons of the push button means 15 are depressed to select a predetermined set of coded symbols, the film sheet 3 having that set of coded symbols is withdrawn from the storage case 2, and the desired frame 3A is disposed in a position intercepting the path of travel of the light beam emanating from the light source 4A.

For the purpose of projecting an image of that frame on the screen 10, the reflector 6 is in the solid line position shown in FIG. 1. In that position of the reflector 6, the image projected thereon by the reflector 4D is reflected toward the screen 10 and can be viewed thereon. When it is desired to print the information of the selected frame 3A, a switch button (not shown) is depressed to actuate the motor 8 and to cause the motor 8 to move the reflector 6 to the broken line position shown in FIG. 1. When the reflector 6 is in the broken line position, the image of the selected frame 3A is projected by means of the reflector 4D on a photosensitive sheet (not shown) which is placed on the conveyor belt 11 at the exposing position 12. The photosensitive sheet is exposed to the image of the selected frame 3A, and is then moved by means of the conveyor belt 11 through the developing means 13 to be developed therein. The developed photosensitive sheet is discharged out of the machine through the outlet port 14. When the reflector 6 is moved to the broken line position, a microswitch (not shown) may be actuated to cause the conveyor belt 11 and the developing means 13 to function.

Figure 2:
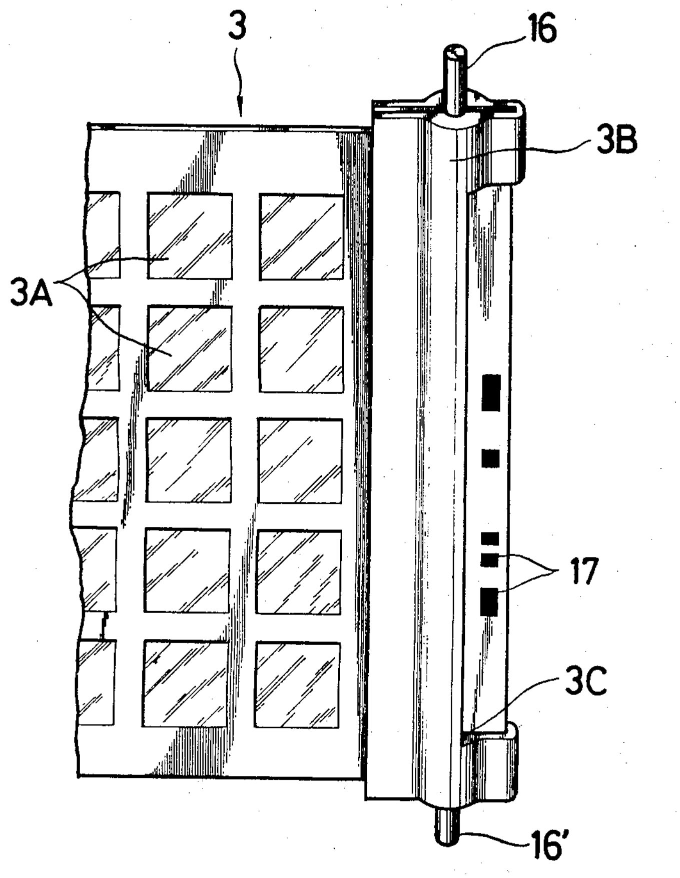
FIG. 2 is a fragmentary front view of a microfiche film sheet utilized in the embodiment shown in FIG. 1.

A microfiche film sheet 3 of the type used in the embodiment of FIG. 1 is shown in greater detail in FIG. 2. Referring to FIG. 2, the microfiche film sheet 3 has a clip 3B attached to the right-hand marginal portion thereof. The clip 3B has support 16 and 16' extending outwardly from the longitudinally opposite ends of the clip 3B. The clip 3B has a cutout 3C which exposes a marginal portion of the film sheet 3. A set of coded symbols 17 is on the portion of the film sheet 3 which is exposed in the cutout 3C. Preferably, the set of coded symbols 17 is photographed on the film sheet 3 and is developed and fixed simultaneously with the photographing, developing and fixing of the microfilmed information in the frames 3A.

Figure 3:
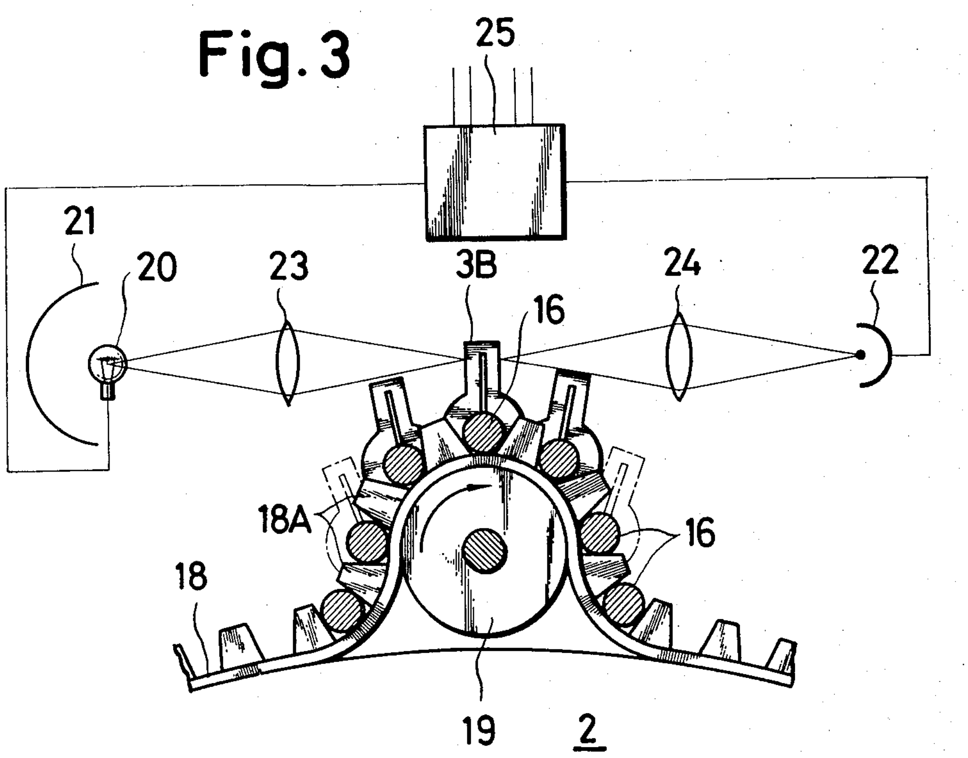
FIG. 3 illustrates one embodiment of a detection device according to the invention.

The microfiche film sheets 3 stored in the storage case 2 may be moved to a detection position in which their coded symbols 17 are read out by means of apparatus of the type shown in FIG. 3. Referring to FIG. 3, a toothed belt 18 is positioned around the circumference of the cylindrical case 2 and may be retained in that position by suitable flanges of the top and bottom walls of the case 2. For the purpose of holding the supports 16 and 16' of the microfiche film sheet clips 3B, the toothed belt 18 has a plurality of radially outwardly extending teeth 18A. Each adjacent pair of teeth 18A may hold therebetween the supports 16 and 16' of the clip 3B of a microfiche film sheet 3. The supports 16 and 16' may be made of a ferromagnetic material, and at least a portion of the case 2 may be a permanent magnet so that the supports 16 and 16' are attracted toward the case 2 and are held between respective adjacent pairs of teeth 18A. For example, the flanges (not shown) of the case 2 which retain the tooth belt 18 around the circumference of the case 2 may be permanent magnets. For the purpose of sequentially moving microfiche film sheet 3 to a detection position, the toothed belt 18 is wrapped around a rotatable roller 19 as illustrated in FIG. 3. Thus, as the toothed belt 18 rotates in the clockwise direction together with the storage case 2, successive microfiche film sheets 3 are moved to a detection position at which the marginal portion of the film sheet that has the coded markings 17 intercepts a detection beam of light as illustrated in FIG. 3.

Still referring to FIG. 3, the coded markings 17 of the microfiche film sheet 3 which is in the detection position are sensed by means of a device comprising a lamp 20 having a reflector 21, a lens system comprising lenses 23 and 24, a light receiving element 22 and a control circuit 25. The light beam generated by the lamp 20 and the reflector 21 is shaped by the lens system 23, transmitted through the marginal portion of the microfiche film sheet 3 which is at the detection position, and is again shaped by the lens system 24. After the lens system 24, the beam illuminates the receiving element 22. The beam which is incident on the receiving element 22 is modulated by the coded markings 17 of the microfiche film sheet 3 that is at the detection position. The electrical signal generated thereby at the receiving element 22 is correspondingly modulated, and is compared at the control circuit 25 with a correspondingly modulated electrical signal corresponding to a set of control symbols selected through the push button means 15. If the output of the light receiving element 22 does not coincide with the electrical signal supplied to the control circuit 25 from the push button means 15, the case 2 and the toothed belt 18 continue to rotate, so that successive microfiche film sheets 3 are moved to the detection position. When the electrical signal generated by the light receiving element 22 coincides with the electrical signal received at the control circuit 25 from the push button means 15, the storage case 2 may be stopped at a selected position, and the desired microfiche film sheet 3 may be moved to a pick-up position where it may be withdrawn to the position shown in FIG. 1.

For the purpose of insuring that the supports 16 and 16' of the clips 3B that are moved away from the case 2 by means of the roller 19 remain between respective teeth 18A of the toothed belt 18, the roller 19 may be a permanent magnet.

Figure 4:
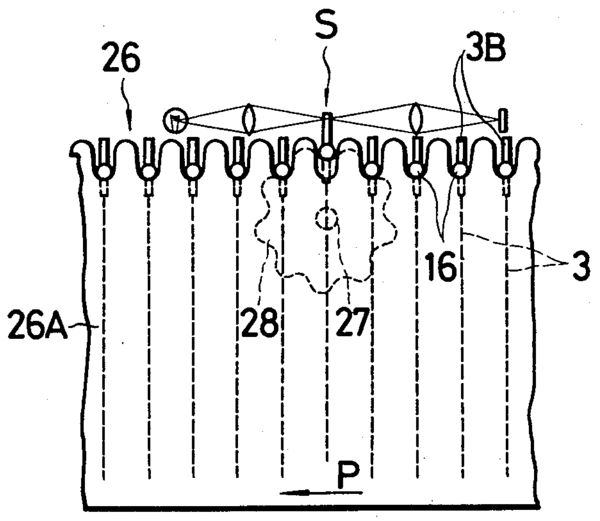
FIG. 4 shows another embodiment of a detection device according to the invention.

A detection device of the type shown in FIG. 3 may be used not only with a rotary cylindrical film sheet storage case, but also in conjunction with an apparatus having either a reciprocating film sheet storage case or a stationary storage case wherein the optical system moves with the withdrawal means. FIG. 4, for example, shows one embodiment of the invention in which the film sheet storage case is adapted to move in reciprocating motion.

Referring to FIG. 4, a plurality of microfiche film sheets 3 are stored in a storage case 26 which has two opposite side walls 26A and 26B (26B is not shown). Each of the walls 26A and 26B has a toothed marginal portion, such that the supports 16 and 16' of microfiche film sheets 3 may be disposed between adjacent pairs of teeth. Preferably, the marginal portions of the two side walls 26A and 26B are each provided with a permanent magnet for attracting and holding the supports 16 and 16', and the supports themselves are made of a ferromagnetic material.

For the purpose of moving successive microfiche film sheets 3 to a detection position S, the embodiment shown in FIG. 4 includes a star wheel 28 which is rotatably supported by a shaft 27. When the storage case 26 moves in the direction of the arrow P, the supports 16 and 16' of successive microfiche film sheets 3 abut against the sides of the teeth of the star wheel 28, and are successively moved thereby away from the storage case 26 and toward the detection position S. The coded symbols 17 of the microfiche film sheet moved to the detection position S are read out by a detection system of the same type as that shown in and discussed in connection with FIG. 3. After a microfiche film sheet 3 has passed through the detection position S, it is returned toward its original position between adjacent pairs of teeth of the walls 26A and 26B by the permanent magnets thereon. The star wheel 28 may be rotated in synchronism with the linear movement of the storage case 26. The supports 16 and 16' may be made of ferromagnetic material; similarly, the walls 26A and 26B may be permanent magnets for the purpose of attracting the supports 16 and 16', and the star wheel 28 may also be a permanent magnet.

Figure 5:
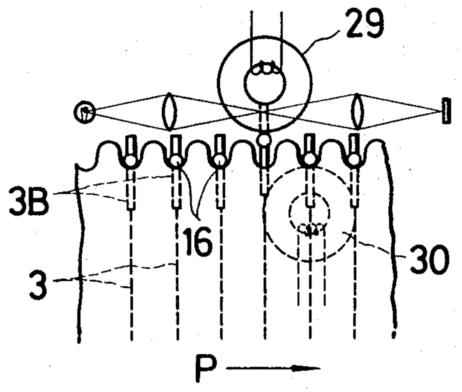
FIG. 5 shows still another embodiment of a detection device according to the invention.

Another means for successively moving the microfiche film sheets 3 stored in a storage case 26 toward a detection position is shown in FIG. 5. Referring to FIG. 5, the storage case is the same as the storage case 26 shown in FIG. 4, and is shown as moving in the direction of the arrow P. Instead of the star wheel 28, the embodiment shown in FIG. 5 utilizes magnetic force to move successive microfiche film sheets 3 to the detection position. In particular, the embodiment shown in FIG. 5 includes a withdrawal magnet 29 which is disposed at the detection position, and a return magnet 30 which is disposed away from the detection position in the direction of the storage case 26. The return magnet 30 is displaced from the withdrawal magnet 29 in the direction of the arrow P by one tooth of the storage case 26. As the storage case 26 moves in the direction of the arrow P, the microfiche film sheet 3 which is indexed with the detection position is brought upwardly by the withdrawal magnet 29 and into the path of the light beam of a sensing device of the type illustrated in FIG. 3. When the withdrawn microfiche film sheet 3 passes the detection position, it is returned toward the storage case 26 by the action of the return magnet 30. The supports 16 and 16' are of ferromagnetic material.

I claim:

1. A microfiche film sheet detection device for successively reading out sets of coded symbols provided on substantially planar microfiche film sheets stored substantially parallel to each other in a storage case for the purpose of selecting thereby a desired film sheet identified by a defined set of coded symbols provided thereon, comprising means for successively moving the sheets stored in the case from their storage positions to a detecting position and for subsequently returning the moved sheets to their storage positions, said moving being substantially in the plane of the moved sheet and said detecting position being occupied by only a single sheet at a time, and detecting means comprising a light source means for generating a beam incident on the coded symbols of a sheet which is in the detecting position, said sheet in the detecting position modulating the light beam incident thereon to generate thereby a modulated beam, and receiving means interposed in the path of said modulated beam, whereby the receiving means is illuminated by a modulated beam representing the coded symbols of the sheet which is in the detecting position and may generate a signal which is a function thereof and may be compared to a signal representing the coded symbols of a desired sheet to thereby identify a desired sheet upon the coincidence of the last-mentioned signals, each film sheet being provided with a clip attached to an edge thereof and having a cutout exposing a marginal portion of the microfiche film sheet, said coded symbols of each sheet being provided on said exposed marginal portion thereof, each clip being provided at the edge of the microfiche film sheet which faces the detecting means at the time the sheet is near the detecting position, said moving means engaging the clips of the sheets to move said sheets to the detecting position.

2. A microfiche film sheet detection device as in claim 1 wherein the moving and returning means comprise a flexible toothed member engaging the clips and moving therewith with respect to the detection means, a roller having an axis of rotation which is stationary with respect to the detection means, said toothed member looped around the roller for moving successive clips and the film sheets attached thereto to said detecting position and for subsequently returning the moved clips to their storage position.

3. A microfiche film sheet detection device as in claim 1 wherein the moving and returning means comprise means for moving the detection means and the storage case with respect to each other and a star wheel having an axis of rotation which is stationary with respect to one of said detection means and storage case, said star wheel engaging the clips between its teeth to thereby move the engaged clips from their storage position to the detection position and from the detection position to the storage position.

4. A microfiche film sheet detecting device as in claim 1 wherein each of said clips includes magnetic material and wherein the moving and returning means comprise means for moving the detection means and the storage case with respect to each other, a withdrawal magnet which is stationary with respect to one of said detection means and storage case, said withdrawal magnet being magnetically coupled with successive clips to move said clips from their storage position to the detecting position, and a return magnet which is successively coupled with clips moved to the detecting position to move said clips to their storage position.

5. A microfiche film sheet detection device as in claim 1 wherein the moving and returning means comprise a flexible toothed member engaging the microfiche film sheets and moving therewith with respect to the detection means, a roller having an axis of rotation which is stationary with respect to the detection means, said toothed belt being looped around the roller for moving successive microfiche film sheets to said detecting position and for subsequently returning the moved microfiche film sheets to their storage positions.

6. A microfiche film sheet detection device as in claim 1 wherein the moving and returning means comprise means for moving the detection means and the storage case with respect to each other and a star wheel having an axis of rotation which is stationary with respect to the detection means, said star wheel engaging successive microfiche film sheets which are in their storage positions to move the engaged microfiche film sheets from their storage positions to the detection position and from the detection position to the storage position.

7. A microfiche film sheet detection device as in claim 6 wherein the star wheel engages the clips of the microfiche film sheets and wherein the star wheel and the clips engaged thereby include magnetic material providing magnetic coupling between the star wheel and the clips engaged therewith.

8. A microfiche film sheet detection device as in claim 1 wherein the microfiche film sheets include magnetic material and wherein the moving and returning means comprise means for moving the detection means and the storage case with respect to each other, a withdrawal magnet which is stationary with respect to the detection means and which is magnetically coupled with successive microfiche film sheets to move the microfiche film sheets coupled therewith from their storage positions to the detecting position, and a return magnet which is stationary with respect to the detecting means and is successively coupled magnetically with microfiche film sheets moved to the detecting position to move said microfiche film sheets to their storage positions.

9. A microfiche film sheet detecting device as in claim 8 wherein said clips include magnetic material and are successively coupled magnetically with said withdrawal magnet and with said return magnet.

10. A microfiche film sheet detection device for successively reading out sets of coded symbols provided on substantially planar microfiche film sheets stored substantially parallel to each other in a storage case for the purpose of selecting thereby a desired film sheet identified by a defined set of coded symbols provided thereon, comprising means for successively moving the sheets stored in the case from their storage positions to a detecting position and for subsequently returning the moved sheets to their storage positions, said moving being substantially in the plane of the moved sheet and said detecting position being occupied by only a single sheet at a time, and detecting means comprising a light source means for generating a beam incident on the coded symbols of a sheet which is in the detecting position, said sheet in the detecting position modulating the light beam incident thereon to generate thereby a modulated beam, and receiving means interposed in the path of said modulated beam, whereby the receiving means is illuminated by a modulated beam representing the coded symbols of the sheet which is in the detecting position and may generate a signal which is a function thereof and may be compared to a signal representing the coded symbols of a desired sheet to thereby identify a desired sheet upon the coincidence of the two last-mentioned signals, wherein the moving and returning means comprise means for moving the detection means and the storage case with respect to each other and a star wheel having an axis of rotation which is stationary with respect to the detection means, said star wheel engaging successive microfiche film sheets which are in their storage positions to move the engaged microfiche film sheets from their storage positions to the detection position and from the detection position to the storage position.

11. A microfiche film sheet detection device as in claim 10 wherein each of the microfiche film sheets is provided with a clip attached thereto and having a cutout exposing a marginal portion of the microfiche film sheet, said coded symbols of each sheet being provided on said exposed marginal portion thereof.

12. A microfiche film sheet detection device as in claim 11 wherein the star wheel engages the clips of the microfiche film sheets and wherein the star wheel and the clips engaged thereby include magnetic material providing magnetic coupling between the star wheel and the clips engaged therewith.

13. A microfiche film sheet detection device for successively reading out sets of coded symbols provided on substantially planar microfiche film sheets stored substantially parallel to each other in a storage case for the purpose of selecting thereby a desired film sheet identified by a defined set of coded symbols provided thereon, comprising means for successively moving the sheets stored in the case from their storage positions to a detecting position and for subsequently returning the moved sheets to their storage positions, said moving being substantially in the plane of the moved sheet and said detecting position being occupied by only a single sheet at a time, and detecting means comprising a light source means for generating a beam incident on the coded symbols of a sheet which is in the detecting position, said sheet in the detecting position modulating the light beam incident thereon to generate thereby a modulated beam, and receiving means interposed in the path of said modulated beam, whereby the receiving means is illuminated by a modulated beam representing the coded symbols of the sheet which is in the detecting position and may generate a signal which is a function thereof and may be compared to a signal representing the coded symbols of a desired sheet to thereby identify a desired sheet upon the coincidence of the two last-mentioned signals, wherein the microfiche film sheets include magnetic material and wherein the moving and returning means comprise means for moving the detection means and the storage case with respect to each other, a withdrawal magnet which is stationary with respect to the detection means and which is magnetically coupled with successive microfiche film sheets to move the microfiche film sheets coupled therewith from their storage positions to the detecting position, and a return magnet which is stationary with respect to the detecting means and is successively coupled magnetically with microfiche film sheets moved to the detecting position to move said microfiche film sheets to their storage positions.

14. A microfiche film sheet detecting device as in claim 13 wherein each microfiche film sheet is provided with a clip attached thereto and having a cutout exposing a marginal portion of the microfiche film sheet, said coded symbols of each sheet being provided on said exposed marginal portion thereof, and wherein said clips include magnetic material and are successively coupled magnetically with said withdrawal magnet and with said return magnet.

15. A microfiche film sheet detection device for successively reading out sets of coded symbols provided on substantially planar microfiche film sheets stored substantially parallel to each other in a storage case for the purpose of selecting thereby a desired film sheet identified by a defined set of coded symbols provided thereon, comprising means for successively moving the sheets stored in the case from their storage positions to a detecting position and for subsequently returning the moved sheets to their storage positions, said moving being substantially in the plane of the moved sheet and said detecting position being occupied by only a single sheet at a time, and detecting means comprising a light source means for generating a beam incident on the coded symbols of a sheet which is in the detecting position, said sheet in the detecting position modulating the light beam incident thereon to generate thereby a modulated beam, and receiving means interposed in the path of said modulated beam, whereby the receiving means is illuminated by a modulated beam representing the coded symbols of the sheet which is in the detecting position and may generate a signal which is a function thereof and may be compared to a signal representing the coded symbols of a desired sheet to thereby identify a desired sheet upon the coincidence of the last-mentioned signals, wherein the moving and returning means comprise a flexible toothed member engaging the microfiche film sheets and moving therewith with respect to the detection means, a roller having an axis of rotation which is stationary with respect to the detection means, said toothed member being looped around the roller for moving successive microfiche film sheets to said detecting position and for subsequently returning the moved microfiche film sheets to their storage positions.

* * * * *